(12) United States Patent
Kang (10) Patent No.: US 8,245,044 B2
(45) Date of Patent: Aug. 14, 2012

(54) PAYMENT TRANSACTION PROCESSING USING OUT OF BAND AUTHENTICATION

(75) Inventor: Denis Dong Kang, Seoul (KR)

(73) Assignee: Visa International Service Association, San Francisco, CA (US)

( * ) Notice: Subject to any disclaimer, the term of this patent is extended or adjusted under 35 U.S.C. 154(b) by 441 days.

(21) Appl. No.: 12/534,042

(22) Filed: Jul. 31, 2009

(65) Prior Publication Data

US 2010/0125737 A1  May 20, 2010

Related U.S. Application Data

(60) Provisional application No. 61/114,981, filed on Nov. 14, 2008.

(51) Int. Cl.
 *G06Q 20/00* (2006.01)
 *H04L 9/32* (2006.01)
(52) U.S. Cl. .......................................... 713/176; 705/35
(58) Field of Classification Search ................... 713/176; 705/35
 See application file for complete search history.

(56) References Cited

U.S. PATENT DOCUMENTS

| | | | |
|---|---|---|---|
| 7,331,518 B2 | 2/2008 | Rable | |
| 7,383,432 B1 | 6/2008 | Barnes et al. | |
| 7,447,784 B2 * | 11/2008 | Eun | 709/229 |
| 8,032,753 B2 * | 10/2011 | Kim et al. | 713/175 |
| 2002/0161723 A1 * | 10/2002 | Asokan et al. | 705/67 |
| 2003/0063750 A1 | 4/2003 | Medvinsky et al. | |
| 2003/0105707 A1 * | 6/2003 | Audebert et al. | 705/38 |
| 2004/0128517 A1 * | 7/2004 | Drews et al. | 713/180 |
| 2006/0206709 A1 * | 9/2006 | Labrou et al. | 713/167 |
| 2007/0050840 A1 * | 3/2007 | Grandcolas et al. | 726/5 |
| 2007/0143230 A1 * | 6/2007 | Narainsamy et al. | 705/75 |
| 2007/0203850 A1 | 8/2007 | Singh et al. | |
| 2008/0091618 A1 | 4/2008 | Obrea et al. | |
| 2008/0229098 A1 * | 9/2008 | Ishak | 713/156 |

FOREIGN PATENT DOCUMENTS

| | | |
|---|---|---|
| KR | 10-2004-0010847 A | 1/2004 |
| KR | 10-2004-0037155 A | 5/2004 |

OTHER PUBLICATIONS

International Search Report and Written Opinion mailed May 27, 2010 in Application No. PCT/US2009/064352, filed Nov. 13, 2009, 11 pages.

* cited by examiner

*Primary Examiner* — Kambiz Zand
*Assistant Examiner* — Aubrey Wysznski
(74) *Attorney, Agent, or Firm* — Kilpatrick Townsend & Stockton LLP (57) ABSTRACT

Systems, apparatuses, and methods for increasing the security of electronic payment transactions, such as eCommerce transactions conducted over the Internet. A transaction approval or authorization mechanism uses an out of band process to provide authentication or identification data that has previously been registered by a user and associated with the user's payment device or account. The out of band authentication data may be provided in response to a message sent to a user's mobile phone, where the message is generated in response to entering the user's phone number into a form that is provided when the user engages in an electronic payment transaction using a desktop computer. The data may include a digital signature and associated digital certificate that is used to authenticate the user.

20 Claims, 5 Drawing Sheets

PAYMENT TRANSACTION PROCESSING USING OUT OF BAND AUTHENTICATION

CROSS REFERENCE TO RELATED APPLICATIONS

This application claims priority from U.S. Provisional Patent Application No. 61/114,981, entitled "Out of Band Authentication," filed Nov. 14, 2008, the contents of which is hereby incorporated in its entirety by reference.

BACKGROUND

Embodiments of the present invention are directed to systems, apparatuses and methods for processing payment transactions, and more specifically, to use of an out of band authentication process in the authorization of an electronic commerce transaction. The out of band authentication process provides both an Issuer and the owner of a valid payment device with added security in situations in which a transaction is conducted remotely and a Merchant is unable to request verifiable identification from a person making a purchase or payment. The inventive out of band authentication process may be used to detect and prevent potentially fraudulent transactions by identifying situations where a transaction is initiated using a personal computer but the operator of the computer is unable to provide the requested out of band authorization for the transaction. The out of band authorization may involve providing data using an out of band communication process, with the data having been registered with an Issuer and associated with a valid owner of the account being used to pay for the transaction.

Consumer payment devices such as debit cards or credit cards are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include identification or authentication data, for example. Some or all of the data read from the payment device is provided to the merchant's transaction or data processing system and then to the Acquirer, which is typically a bank or other institution that manages the merchant's account. The data provided to the Acquirer may then be provided to a payment processing network (e.g., a payment processor) which processes the data to determine if the transaction should be authorized by the network, and assists in the clearance and account settlement functions for the transaction. The authorization decision and clearance and settlement portions of the overall transaction may also involve communication and/or data transfer between the payment processing network and the bank or institution that issued the payment device to the consumer (the Issuer). Transactions in which a consumer payment device is presented to a merchant or accessed by a point of sale terminal are termed "card present" transactions since the payment device is in the same physical location as the merchant or terminal.

In addition to card present transactions, a consumer may also initiate a transaction in a situation in which the payment device is not in the same physical location as the merchant or terminal, and instead the relevant data is provided over a communications network to the merchant (termed a "card not present" transaction). For example, a card not present transaction involving the purchase of a product or service may be initiated by a consumer by providing payment data from a remote location to a merchant over a network such as the Internet. Transactions of this type are typically initiated using a computing device such as a personal computer or laptop computer. Thus, payment information for a transaction may be provided using a payment device and point of sale terminal or remotely located computing device, among other methods.

Given the large number of transactions and the amounts of money involved, the detection and prevention of fraud is an important consideration of any transaction processing system. In order to address this problem, payment processors and others involved in authorizing a transaction typically require that a user provide one or more forms of authentication or identification prior to authorizing a transaction. In a card present transaction, a merchant may simply ask for another form of identification from the customer, such as a picture ID (driver's license, passport, etc.) to provide additional assurance that the customer is authorized to use the consumer payment device being presented.

However, in the case of a card not present transaction (such as an eCommerce transaction conducted over the Internet) a merchant cannot as readily be certain that the person who is attempting to use a payment device is the person who is authorized to use that device. The remote nature of the transaction makes a picture ID or other form of identification both impractical and unreliable as a means of authenticating a consumer. Further, requesting an additional piece of supposedly confidential data from the person attempting to use the payment device may not be sufficient to verify that the person is authorized to use the payment device. This is because in some situations the additional data may be obtained fraudulently in the same manner as the payment device account data (e.g., by improperly obtaining access to a person's computer that stores the account data and other confidential data).

What is desired is a system, apparatus and method for authorizing an electronic payment transaction, such as an eCommerce transaction, and which overcomes the disadvantages or limitations of current approaches.

SUMMARY

Embodiments of the present invention are directed to systems, apparatuses, and methods for increasing the security of electronic payment transactions, such as eCommerce transactions conducted over the Internet. Embodiments of the present invention introduce a transaction approval or authorization mechanism that uses an out of band process (i.e., a process using a different communication channel than the one being used for the transaction) to provide authentication or identification data that has previously been registered by a user and associated with the user's payment device or account. In some embodiments the out of band authentication data may be provided in response to a message sent to a user's mobile phone, where the message is generated in response to entering the user's phone number into a form that is provided when the user engages in an electronic payment transaction using a desktop computer. In some embodiments, the data may include a digital signature and associated digital certificate that is used to authenticate the user.

Embodiments of the invention may be used as part of a regular transaction approval process for every transaction, for transactions satisfying a specified criteria (e.g., transactions involving purchases above a specified threshold, transactions in excess of a certain number or total value during a predetermined period, transactions having a specified risk profile, etc.), or as an approval process for transactions in situations in which there is some reason to suspect potential fraud (such as those transactions in which a "challenge" message might normally be generated). Embodiments of the invention are able to detect and prevent the completion of potentially fraudulent transactions in situations in which a person initiating a transaction using a first communication channel (e.g., a computer communicating over the Internet) is unable to provide previously registered authentication data (e.g., security data, a digital certificate, etc.) over a second communication channel (e.g., a mobile phone communicating over a wireless network) when requested to as part of the transaction approval process. Similarly, embodiments of the invention may be used to provide confirmation that a person initiating a transaction is authorized to use a particular payment device or account for the transaction by virtue of their being able to provide the requested authentication data over the second communication channel. Embodiments of the present invention may be used to increase the security of electronic payment transactions and thereby provide benefits to both Issuers and valid users of payment devices.

In some embodiments, the inventive out of band authentication process includes transferring authentication or security data issued to a user (such as a digital certificate) and that is resident on the user's computing device to the user's mobile phone, and associating the user's payment account with the user's mobile phone. When a person using the computing device initiates an electronic payment transaction, the person is asked to provide the mobile phone number to the Issuer, who then causes a message to be sent to the mobile phone. If the message is responded to by selecting the proper authentication data resident on the mobile phone, then the transaction is approved. In this way a transaction initiated using a personal computer can only be approved and fully executed if the person using the personal computer is also the person whose mobile phone number is associated with the account used for the transaction. Further, the person initiating the transaction must be in possession of the mobile phone, so that the authentication data issued to the personal computer is available on the person's mobile phone.

In one embodiment, the present invention is directed to a transaction processor, where the transaction processor includes an electronic processor, a memory coupled to the electronic processor, and a set of instructions stored in the memory which, when executed by the electronic processor implement a process to receive a request to authenticate a transaction initiated by a user at a merchant's web-site, send a request for authentication data to the user over a first communications channel, receive a response to the request for authentication data from the user over the first communications channel, process the received response to obtain the user's contact data to enable contacting the user over a second communications channel, send a request to approve the transaction to the user over the second communications channel, and in response to the request to approve the transaction, receive a message from the user approving or denying the transaction over the second communications channel.

In another embodiment the present invention is directed to a method of processing an electronic payment transaction, where the method includes registering a user by associating contact data for the user with the user's payment account, receiving a request to authorize an electronic payment transaction initiated by the user, sending a request for authentication data to the user over a first communications channel, receiving a response to the request for authentication data over the first communications channel, processing the response to determine contact data for the user, generating a transaction approval message to be sent to the user, sending the transaction approval message to the user over a second communications channel using the contact data, and in response to the transaction approval message, receiving a message from the user approving or denying the transaction.

In yet another embodiment the present invention is directed to a method of processing an electronic payment transaction, where the method includes receiving a request to authenticate the electronic payment transaction from a merchant's web-site, wherein the electronic payment transaction is initiated by a user, sending a request for authentication data to the user over a first communications channel, receiving a response to the request for authentication data over the first communications channel, processing the response to determine the user's mobile phone number, generating a transaction approval message to be sent to the user, and sending the transaction approval message to the user's mobile phone.

Other objects and advantages of embodiments of the present invention will be apparent to one of ordinary skill in the art upon review of the detailed description of the present invention and the included figures.

DETAILED DESCRIPTION

Figure 1:
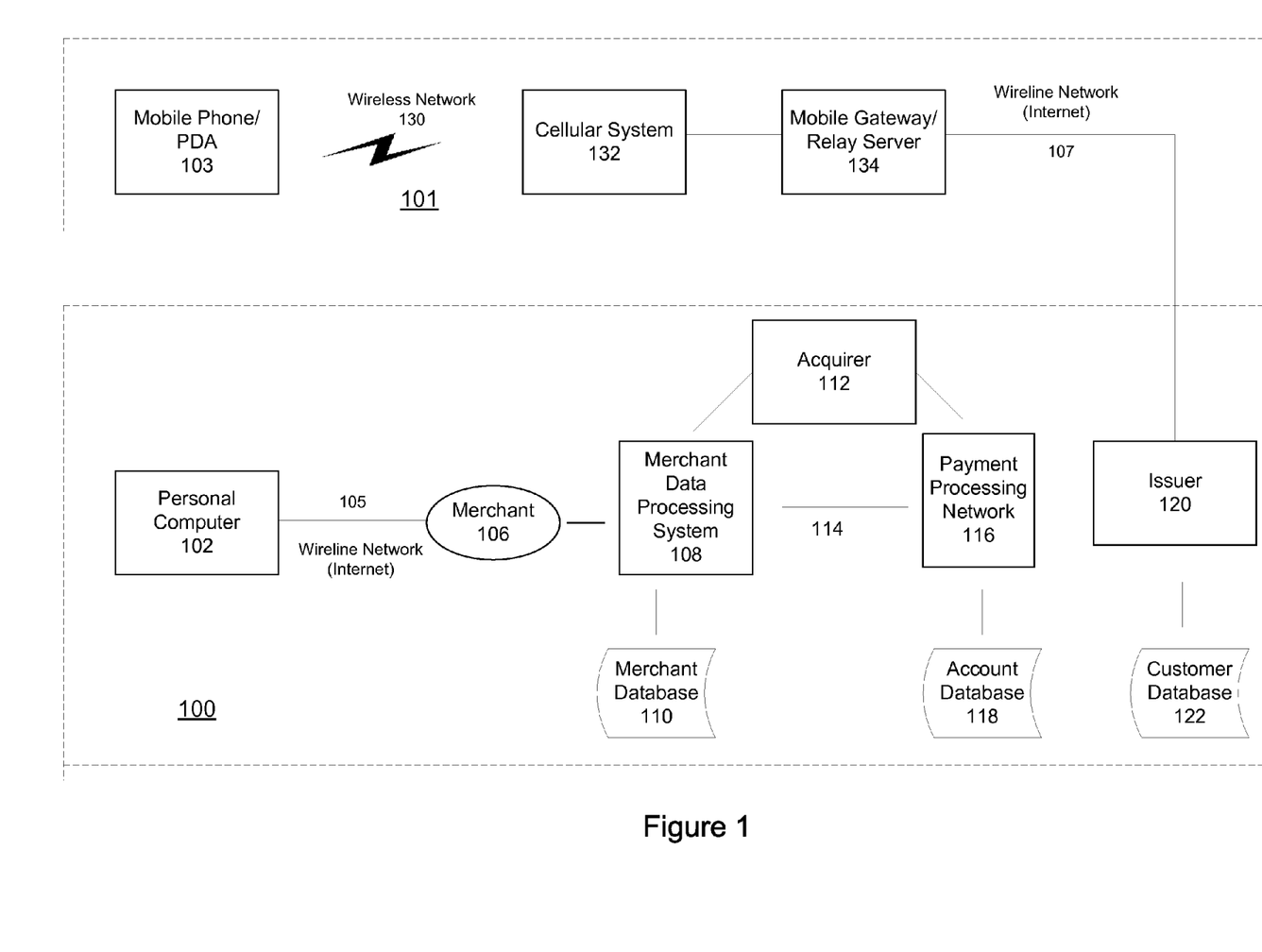
FIG. 1 is a functional block diagram illustrating the primary functional elements of an exemplary system for authorizing an electronic payment transaction using an out of band authentication process, in accordance with some embodiments of the present invention.

Embodiments of the present invention are directed to systems, apparatuses, and methods for increasing the security of electronic payment transactions, such as eCommerce transactions conducted over the Internet. Embodiments of the invention are typically implemented in the context of an electronic payment transaction; therefore prior to describing one or more embodiments of the invention in greater detail, a brief discussion of the entities involved in authorizing an electronic payment transaction and their roles in the authorization process will be presented. FIG. 1 is a functional block diagram illustrating the primary functional elements of an exemplary system for authorizing an electronic payment transaction using an out of band authentication process, in accordance with some embodiments of the present invention. FIG. 1 illustrates two primary functional architectures or systems. The first (labeled element 100) illustrates the functional elements that are typically involved in an electronic payment transaction and the authorization process for such a transaction. The second functional architecture (labeled element 101) illustrates the functional elements that may be used in combination with some or all of those of element 100 to implement embodiments of the present invention.

As shown in element 100 of FIG. 1, in a typical eCommerce transaction, a consumer wishing to purchase a good or service from a merchant provides payment account and transaction data (which may be used as part of an authorization process) by means of a device 102. In an eCommerce transaction, the consumer may enter data into a consumer device capable of communicating with a merchant or other element of system 100, such as a laptop or personal computer.

The payment account and transaction data (as well as any required consumer data) is communicated over a communication network 105 (e.g., the Internet or other suitable network or communications channel) to the merchant 106 and ultimately to the merchant's transaction/data processing system 108. The data may be provided to communication network 105 by any method or elements suitable for use with device 102. If device 102 is a consumer's desktop or laptop computing device, then the data may be provided by a connection to the Internet, such as a cable modem or wireless router. Depending on the merchant or transaction involved, communication network 105 may be the Internet, a closed network such as a corporate network, a wireless network, or other suitable form of data transport channel.

As part of the authorization process performed by the merchant, merchant transaction processing system 108 may access merchant database 110, which typically stores data regarding the customer/consumer (as the result of a registration process with the merchant, for example), the consumer's payment device, and the consumer's transaction history with the merchant. Merchant transaction processing system 108 typically communicates with Acquirer 112 (which manages the merchant's accounts) as part of the overall authorization process. Merchant transaction processing system 108 and/or Acquirer 112 provide data to Payment Processing Network 116, which among other functions, participates in the clearance and settlement processes that are part of the overall transaction processing. Communication and data transfer between Merchant transaction processing system 108 and Payment Processing Network 116 may be by means of a direct connection 114, or by means of an intermediary, such as Acquirer 112. As part of the transaction authorization process, Payment Processing Network 116 may access account database 118, which typically contains information regarding the consumer's account payment history, chargeback or dispute history, credit worthiness, etc. Payment Processing Network 116 communicates with Issuer 120 as part of the authorization process, where Issuer 120 is the entity that issued the payment device to the consumer and manages the consumer's account. Customer or consumer account data is typically stored in customer/consumer database 122 which is accessed by Issuer 120 as part of the authorization and account management processes.

In standard operation, an authorization request message is created during or after a consumer purchase of a good or service at a point of sale (POS). The point of sale may be a merchant's physical location or as in the present case, a virtual point of sale such as a web-site that is part of an E-commerce transaction. In a typical transaction, the authorization request message is sent from the point of sale to the merchant's Acquirer 112, to a Payment Processing Network 116, and then to an Issuer 120. An "authorization request message" can include a request for authorization to conduct (or approval for) an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

Payment Processing Network 116 may include data processing subsystems, networks, and other means of implementing operations used to support and deliver authorization services, exception file services, and clearance and settlement services for payment transactions. An exemplary Payment Processing Network may include VisaNet™. Payment Processing Networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment Processing Network 116 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 116 may use any suitable combination of wired or wireless networks, including the Internet, to permit communication and data transfer between network elements. Among other functions, Payment Processing Network 116 may be responsible for ensuring that a user is authorized to conduct a transaction (via an authentication process), confirm the identity of a party to a transaction (via receipt of a personal identification number), confirm a sufficient balance or credit line to permit a purchase, or reconcile the amount of a purchase with the user's account (via entering a record of the transaction amount, date, etc.).

As also illustrated in FIG. 1 (in the exemplary form of the components of system/element 101), a consumer may also have access to a mobile phone or personal data assistant (PDA) that communicate over a wireless network 130 with a cellular system 132. In some embodiments of the present invention, cellular system may be capable of communication and data transfer with a mobile gateway/relay server 134. Mobile gateway/relay server 134 is capable of coupling the cellular (wireless) network or system to a second network (typically a wireline network such as the Internet) and enabling the transfer of data between the networks. Mobile gateway/relay server 134 may perform data processing operations as needed to permit the efficient transfer of data between the two types of networks, including, but not limited to, data reformatting or other processing to take into account differences in network protocols. Mobile gateway/relay server 134 may also perform data processing operations to enable more efficient data transfer between the networks and devices coupled to each type of network, such as for purposes of improving the ability of a user to utilize the received data on a mobile device.

Mobile gateway/relay server 134 communicates with Issuer 120 over a suitable communications channel 107, such as the Internet. As will be described, mobile gateway/relay server 134 functions to relay or transfer a message or other form of request for authentication data generated by Issuer 120 (or another suitable entity such as an element of the payment processing network) to enable its transmission over the cellular network to a user's mobile phone or other form of wireless device.

In some embodiments of the inventive out of band authentication process, an authentication mechanism is used in which a cardholder who is performing a transaction using a first communications channel is requested to authorize or approve the transaction using data provided by means of a second communications channel. For example, a user may be engaging in a purchase transaction on the web site of a merchant using a personal computer. As part of the purchase transaction, the user may receive a message delivered to his cellular phone asking him to enter a password, select a digital certificate, or provide another form of authentication or approval to confirm the web site purchase. If the user receives the message and responds with the requested data, a response may be sent from the cellular phone to the Issuer by way of the mobile gateway/relay server. The purchase transaction can then be completed. If the message is not responded to, or is not responded to properly, then the Issuer may conclude that the transaction is possibly fraudulent and deny approval for the transaction.

Figure 2:
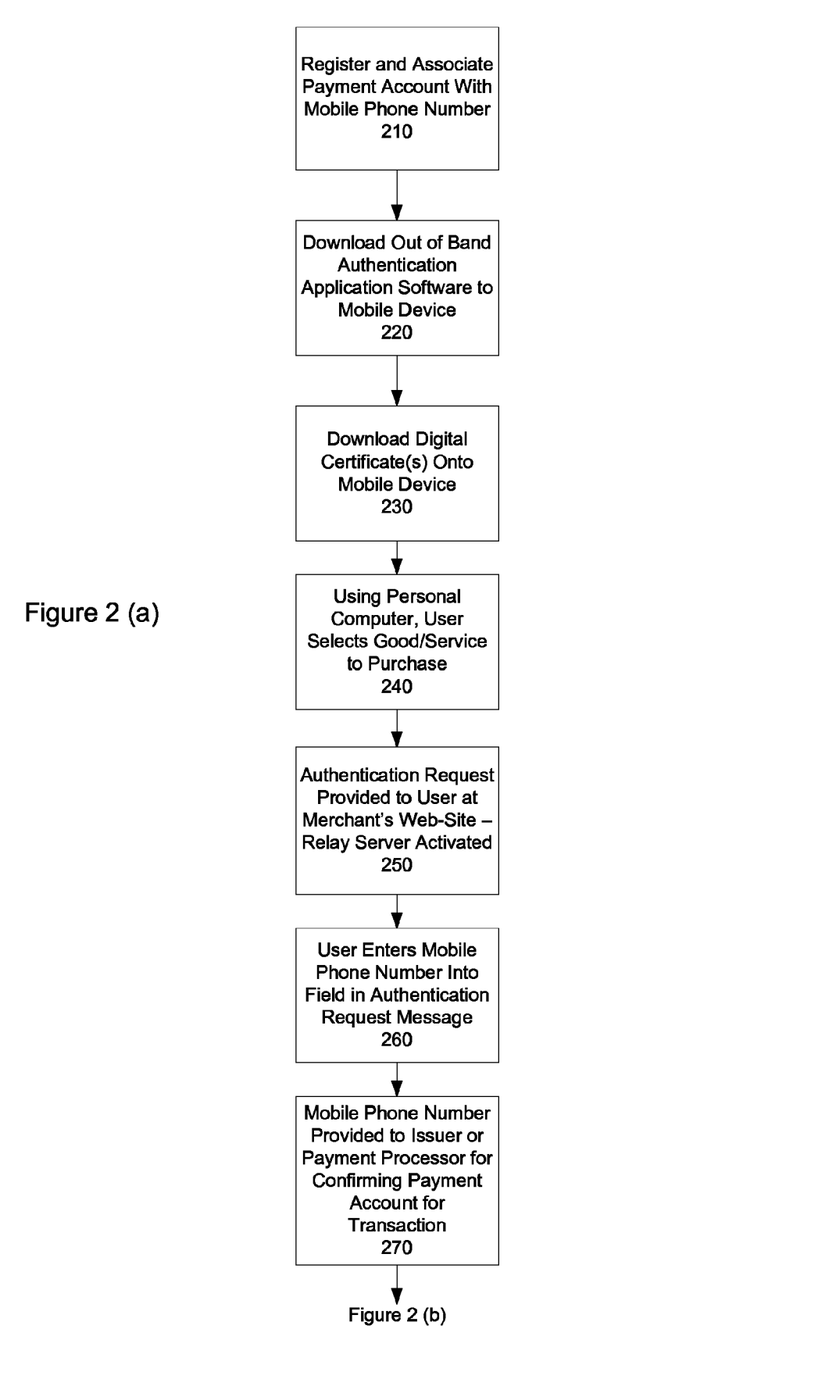
FIGS. 2(a) and 2(b) are flowcharts illustrating a process for authenticating a user conducting an electronic payment transaction using an out of band authentication procedure, in accordance with some embodiments of the present invention.

FIGS. 2(a) and 2(b) are flowcharts illustrating a process for authenticating a user conducting an electronic payment transaction using an out of band authentication procedure, in accordance with some embodiments of the present invention. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments. Note further that in some embodiments, one or more of the stages of the illustrated process may be combined or not executed without departing from the underlying concepts of the invention.

As shown in FIG. 2(a), in some embodiments the inventive process may include a user registering the user's mobile phone number and associating the mobile phone number with the user's payment account (stage 210). The payment account may be an account associated with a credit card, a debit card, a savings account, a checking account, or other suitable payment mechanism. The registration may be accomplished by accessing a web-site or submitting the information by another suitable method. The web-site or other submission method may be operated for the benefit of the Issuer responsible for the payment account (such as element 120 of FIG. 1), or by an element of the payment processing network (element 116 of FIG. 1), such as a payment processor, for example. In some embodiments, the registration process may be executed using either the user's computing apparatus or mobile phone (for example, personal computer 102 or mobile phone/PDA 103 of FIG. 1). Regardless of the entity operating the registration site, the Issuer and/or payment processor will typically be advised of the user's registration and of the association between the user's payment account and mobile phone number. Typically, the association between the user's payment account data and mobile phone number will be stored in a database or other suitable format, such as a mapping table that is maintained by the Issuer, the payment processor, or both (for example, account database 118 and/or customer database 122 of FIG. 1).

At stage 220, the user is prompted to download a set of executable instructions in the form of an application software routine to their mobile phone (element 103 of FIG. 1). The application may be downloaded to the mobile phone over the wireless network (element 130 of FIG. 1), via a direct connection to the Internet or a computing device, or another suitable method. The downloaded application is used to manage, control and execute the out of band authentication process, and will typically enable the mobile phone to perform one or more of the following functions:

Download to the mobile phone one or more digital certificates issued by a certificate authority (CA), where the certificates may be downloaded from a server operated by an Issuer, certificate authority, or other entity—the certificates will typically correspond to or be duplicates of one or more certificates resident on the user's computing device that have previously been registered and associated with the user. The digital certificates may be used to provide a digital "signature" to authenticate an approval of a payment transaction;

Download and install encryption software on the phone—the encryption software is typically used to provide secure data transfer between the mobile phone and the mobile gateway/relay server; and Download and install communication software on the phone—the communication software is used for enabling communication between the mobile gateway/relay server and the mobile phone.

After download of the out of band authentication software application to the mobile phone, one or more digital certificates are downloaded to the mobile phone (stage 230). The digital certificates may be used to provide a digital signature to authenticate a response to a request to approve a payment transaction. The digital certificates may be issued by any suitable certificate authority (CA), including but not limited to, a governmental agency, private business, Issuer, payment processor, security provider, etc. The digital certificates may be newly issued to the user or may be digital certificates that were previously provided to the user and stored on the user's personal computer. The digital certificates may be uploaded from the personal computer and then transferred to the mobile phone, or may be downloaded from a certificate server that stores copies of certificates previously provided to the user.

At a later time the user accesses a merchant or vendors web-site using their personal computer or other suitable computing device (stage 240). The user selects the goods or services they desire to purchase and enters the data required to initiate the transaction. This data may include the purchaser's name or other form of identification. In some embodiments, the user may enter payment account data such as a credit or debit card number into a field on the merchant's web-site. As part of the authentication process (such as that described with reference to FIG. 1), the payment account data may be used by a payment processor to identify the Issuer of the payment device (e.g., the credit or debit card). Identification of the Issuer then results in generation of an authentication request message that is presented to the user at the merchant's web-site and displayed on the user's personal computer (stage 250). In some embodiments, the authentication request message will include a field for entry of the user's mobile phone number.

In some embodiments, and prior to the user receiving a request for their mobile phone number, the user's computing device may present a list of possible payment accounts (such as credit card accounts, debit card accounts, etc.) to the user and enable them to select which payment account they wish to use for the transaction. The list of accounts may represent (or be derived from) the Issuers, payment processing entities, or certificate authorities that have provided digital certificates (or other forms of authorization) to the user and that are stored on the computing device. Selection of a payment account will permit the Issuer associated with that account to be identified and result in triggering a request from the Issuer or payment processor for the user's mobile phone number. As mentioned, selection of a payment account may also result in notifying an intermediary entity (such as a payment processor) of the transaction and result in triggering a request from that entity for the user's mobile phone number.

In some embodiments, a user may be offered the option of entering their mobile number as part of completing the transaction. In such cases, entry and submission of the mobile number may be processed by the Issuer or payment processor to confirm the previous registration of the user and result in triggering the sending of the out of band authentication message to the mobile number. Further, in some embodiments, the act of sending the authentication request to the user may activate a process in the mobile gateway/relay server (element 134 of FIG. 1) which informs the mobile gateway/relay server of the authentication request and may initiate preparations for executing portions of the out of band authentication process.

Note that the registration process (described with reference to stage 210) may be performed either prior to or at the time of initiating a transaction using a merchant's web-site. In a situation in which the registration (and subsequent download of the software application and digital certificates) is performed at the time of visiting the merchant's web-site, the registration process may be initiated by activating a user interface element provided by an Issuer or payment processor in response to a user initiating the transaction.

Note further that in addition to other possible use cases or scenarios, embodiments of the present invention may be used in the following exemplary situations:

(1) If the user provides their payment account data (such as an account number, credit card number, etc.) or other identifying data (e.g., name or other previously registered data that has been associated with a mobile phone number) to the merchant in the process of completing the payment transaction, then embodiments of the present invention may perform a lookup to determine if there is a mobile phone number that is registered as being associated with that payment account or other data. In such a case, a message or other form of communication may be sent to the mobile number without requesting further information. This implementation may not provide the security of shielding the payment account data from the merchant web-site, but does enable the out of band authentication process to be triggered without additional user input;

(2) If the user provides their mobile phone number as part of the transaction and not the payment account data, then the security of the payment account data is maintained, and embodiments of the present invention can operate to lookup the payment account(s) previously registered and associated with the mobile number to determine the payment account to be used for the transaction, or to request the user to identify the desired payment account for the transaction.

In response to the authentication request message (and if the user has previously registered to use the out of band authentication process), the user enters their mobile phone number into the appropriate field in the message (stage 260). The mobile phone number may also be provided by another suitable method, such as part of a separate message directed to the Issuer. The user's mobile phone number is provided to the Issuer and if desired, used to confirm the payment account that should be used to pay for the transaction (via a lookup table or other suitable data structure). This is done by determining the payment account that was previously associated with the submitted mobile phone number (stage 270). Note that in some embodiments, the mobile phone number may be provided to the payment processor instead of or in addition to the Issuer, with the payment processor being the entity responsible for generating the communications to the user and processing the user's responses.

After verifying that the submitted mobile phone number is properly associated with a valid payment account that will be used for the transaction, the Issuer generates, or causes to be generated, a message to the user that is delivered to the user on their mobile phone (stage 280). The message may be in any suitable form and is provided to the mobile gateway/relay server or generated by the mobile gateway/relay server for transmission to the user over the wireless/cellular network to the user's mobile phone. The message may be a SMS message which may cause activation of an application installed on the mobile phone. The message may include a "callback URL" that identifies a web-site or server location to which a response to the message should be directed. The message will typically contain information regarding the transaction and payment for the transaction. Note that as mentioned, a payment processor may be the entity responsible for generating the message or messages delivered to the user's mobile phone, or may serve as an intermediary that receives instructions from the Issuer and in response generates the desired message(s).

At stage 282, the user is asked to confirm or approve payment for the transaction using their mobile phone. The confirmation may take the form of entering data using the phone keypad, providing a verbal or audio response using the mobile phone microphone, or another suitable method. The entered data may be a single character, a string of characters, or an indicator character, among suitable forms of response or input. If the user response is to confirm or approve payment for the transaction (the "yes" branch), then the user is presented with a list or other form of display of the digital certificates stored on the mobile phone (stage 284). Display or presentation of the list of certificates will typically be managed or controlled by the out of band authentication software application that was previously downloaded to and installed on the mobile device. If the user response is to decline to confirm or approve payment for the transaction (the "no" branch), then the out of band authentication application is terminated and the transaction decline is provided to the Issuer (stage 283).

If payment for the transaction is approved and the list of digital certificates stored on the mobile phone is presented to the user, then the user will be asked to input a selection of which digital certificate they wish to use to authorize the transaction. In addition to selecting the certificate, the user may be requested to enter a password or other form of security data (stage 286). The selected certificate is used to authenticate the user and authorize the transaction. The selected certificate may be issued to the user by the relevant certificate authority (CA) for a specified class of transactions (e.g., banking, eCommerce, stock trades), or may be unique to a specific merchant, group of merchants, or Issuer. In some embodiments, the certificate enables the use of a previously distributed encryption key that is associated with the user to encrypt and decrypt data provided by the user, or to the user.

Next, the out of band authentication software application that was previously downloaded to and installed on the mobile device generates a payment confirmation message. The payment confirmation message may include the digital signature (or a form of that data) associated with the selected certificate, and/or other relevant data such as additional forms of authentication or identification, for example a password (stage 288). The digital signature can serve to authenticate the user as the intended recipient of the payment approval request. The confirmation message is transmitted from the mobile phone over the wireless network to the cellular system infrastructure, and then to the mobile gateway/relay server. The mobile gateway/relay server enables the confirmation message to be provided to the Issuer or payment processor (stage 290). The mobile gateway/relay server may also enable the confirmation message to be provided to the user's computing device that initiated the transaction (such as personal computer 102 of FIG. 1). Note that the confirmation message may also be directed to a desired location based on the "callback URL" provided in the message received at the user's mobile phone that requested approval of the transaction. The "callback URL" may refer to the location of a server operated by the Issuer, payment processor, or other entity involved in the processing of the transaction.

The Issuer authenticates the payment message generated on the mobile phone, typically by processing the received digital certificate or signature to determine that it is a valid one and is associated with the owner of the payment account being used for the transaction (stage 292). The Issuer will then typically communicate its approval of the transaction to the payment processing network after which the transaction authorization process may continue in the manner described with reference to FIG. 1.

Embodiments of the inventive system, apparatus, and method for processing payment transactions using an out of band authentication process have been described with reference to initiating a transaction using a first device (e.g., a personal computer) communicating over a first communications network (e.g., the Internet) followed by providing authentication data (e.g., a digital signature or certificate) using a second device (e.g., a mobile phone) communicating over a second communications network (e.g., a wireless or cellular network). However, embodiments of the present invention may be practiced using other implementations as well. For example, both the initiation and authentication of the transaction may be communicated over a wireless network. In addition, the authentication data may be different from a digital signature or digital certificate; for example it may consist of a password or other security data that has previously been associated with a valid user of a payment account. In such a use case, an account owner may have previously registered their account with a payment processor or Issuer and submitted a password or other form of security data that is associated with their account. During a transaction, the account owner may be requested by the payment processor or Issuer to enter their password or security data into a field in order to authenticate themselves and enable the authorization of the transaction. The authentication data (in whatever form or substance) may be encrypted using a standard encryption process such as one based on the public key infrastructure (PKI) system, in which case a digital certificate is typically used to associate a user with an encryption key issued to that user. Embodiments of the present invention may be used to supplement such a security process by providing either another layer of security (e.g., a second confirmation of the identity of the account owner and their approval of the transaction), or a different means of submitting the previously registered password or security data.

Figure 4:
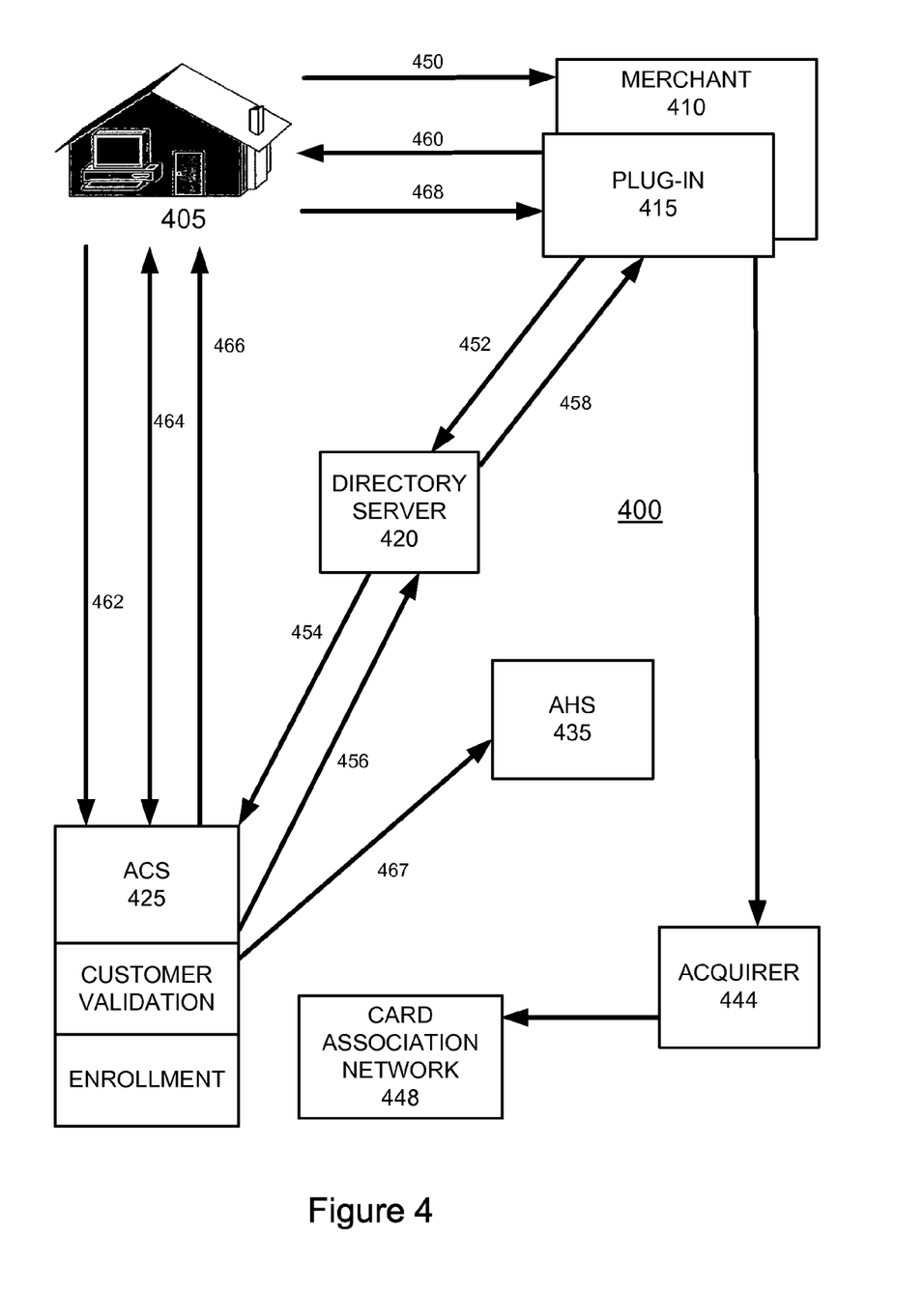
FIG. 4 is a diagram illustrating a card or payment device authentication system which may be used with embodiments of the present invention.

As an example, a suitable process to which embodiments of the present invention may be appended or which embodiments of the present invention may be used to modify is described in U.S. Pat. No. 7,007,840, entitled "Managing Activation of Cardholders in a Secure Authentication Program", issued Mar. 7, 2006, and the contents of which is hereby incorporated by reference it its entirety for all purposes. FIG. 4 is a diagram illustrating a card or payment device authentication system 400 which may be used with embodiments of the present invention. In some embodiments, system 400 enables cardholders to be authenticated when making electronic commerce card purchases online. In an embodiment, cardholder system 405 initiates an online purchase by accessing a merchant computer 410. In an embodiment, cardholder system 405 accesses a website provided by the merchant computer 410 via the Internet via a web browser. Alternatively, cardholder system 405 can access the merchant computer 410 via an alternate electronic communications network. Cardholder system 405 can be any type of communications device, for example a personal computer, a personal digital assistant, or a telephone. To complete a purchase, a cardholder uses the cardholder system 405 to submit his or her electronic commerce card information 450, such as a card number and expiration date, to the merchant system 410. In an embodiment, a secure communication system, such as SSL, is used for all communications, including the electronic commerce card information 450.

In response to the electronic commerce card information 450, the merchant system initiates an authentication procedure to determine whether the electronic commerce card information is valid and has been provided by an authorized cardholder. In an embodiment of system 400, there are numerous electronic commerce card issuers. Each electronic commerce card issuer is responsible for authenticating its own electronic commerce cards. To authenticate the electronic commerce card information 450, the merchant system 410 locates the authentication service of the electronic commerce card issuer associated with the electronic commerce card information 450. The merchant system sends a verifying enrollment request (VEReq) 452 to a directory server 420 to locate the appropriate authentication service. In an embodiment, authentication-related communication is coordinated by an authentication plug-in 415 integrated with the merchant system 410. The VEReq 452 includes at least a portion of the electronic commerce card information 450 to be used by the directory server 420 to identify the authentication service associated with the cardholder's electronic commerce card. In an embodiment, each electronic commerce card issuer is assigned a different range of electronic commerce card numbers. This embodiment of the directory server 420 includes a list of all electronic commerce card issuers and their associated electronic commerce card number ranges. By comparing the electronic commerce card information with the list of electronic commerce card issuers, the directory server 420 is able to identify the appropriate authentication service.

After identifying the authentication service, the directory server 420 forwards the VEReq 454 to an access control server (ACS) 425 associated with the card issuer's authentication service. The ACS 425 determines whether the card information provided in the VEReq 454 can be authenticated. Card information may not be able to be authenticated by the ACS 425 if, for example, the card information does not include a valid electronic commerce card number, or if there is no authentication information associated with the electronic commerce card number. If the electronic commerce card information provided in the VEReq 454 can be authenticated, the ACS 425 sends a verified enrollment response (VERes) 456 back to the directory server 420. The VERes 456 includes a message indicating that the ACS 425 can authenticate the electronic commerce card information and may contain a pseudonym corresponding to the card number. The pseudonym can be any type of code or number that can be uniquely linked to card information by the ACS 425 at a later time. The VERes also includes a URL to be accessed by the cardholder system 405 to authenticate the cardholder. For system 400, the URL is associated with a web site provided by the ACS 425. Upon receiving a VERes from the ACS 425, the directory server 420 forwards the VERes 458 to the merchant system 410.

From the received VERes, the merchant system 410 generates an authentication request. The authentication request includes the pseudonym created by the ACS 425 and transaction information associated with the cardholder's prospective purchase. The merchant system then forwards the authentication request 460 to the cardholder system 405. In an embodiment, the authentication request is sent to the cardholder system 405 with a web page having a redirection command, such as an HTTP redirect, to a web site hosted by the ACS 425. This web page also includes a URL for returning information to the merchant system 410. In response the authentication request received from the merchant system 410, the cardholder system 405 accesses 462 a web site hosted by the ACS 425. In some embodiments, in accessing this web site, the cardholder system 405 supplies the ACS 425 with the pseudonym originally created by the ACS for the VERes. The cardholder authenticates his or her identity by presenting authentication information 464 to the web site provided by the ACS 425. In an embodiment, the cardholder authenticates his or her identity by providing to the ACS 425 a password or other identifying information previously associated with the electronic commerce card. If a pseudonym was used, the ACS 425 uses the pseudonym provided by the cardholder system to identify the electronic commerce card being supplied by the cardholder and retrieve authentication information previously associated with the electronic commerce card. In an embodiment, the ACS 425 matches the pseudonym received via the authentication request 462 with the pseudonym previously created for VERes 456. In a further embodiment, the pseudonym expires after a limited period of time, for example five minutes, to prevent fraudulent reuse of the authentication request.

The ACS 425 returns an authentication response 466 to the cardholder system 405. The cardholder system 405 in turn forwards the authentication response 468 to the merchant system 410. If the authentication information 464 provided by the cardholder matches the authentication information previously associated with the electronic commerce card, the authentication response includes a message indicating that the authentication was successful. Alternatively, the authentication response can include a message indicating that the authentication failed. In a further embodiment, the authentication response also includes an error code identifying the reason for authentication failure. In addition to sending the authentication response to the merchant system 410, a copy of the authentication response 467 is sent to an authentication history server 435. The authentication history server 435 maintains an archive of all authentications performed by the system 400. The authentication response is digitally signed to prevent the cardholder system 405 or other third party systems from tampering with the contents of the authentication response. After receiving the authentication response 468, the merchant system 410 validates the authentication response. To validate the authentication response 468, the merchant system 410 first verifies the digital signature associated with the authentication response to ensure that there has not been any tampering. Once the authentication response is determined to have arrived intact, and the response is for the request originally submitted, the contents of the authentication response are analyzed to determine if authentication has been successful. If the authentication was not successful, the merchant system 410 halts the transaction. If the authentication was successful, the merchant system 410 can continue with the transaction by initiating a charge to the electronic commerce card provided by the cardholder. In an embodiment, the merchant system 410 charges the electronic commerce card by submitting the card information to a card acquirer 444. The card acquirer then sends the charge request over a private card association network 448 to be processed by the electronic commerce card issuer associated with the card. In a further embodiment, an electronic commerce indicator and a Cardholder Authentication Verification Value, which indicates that the electronic commerce card has been successfully verified, is included with the charge request.

As described, embodiments of the inventive system, apparatus, and method involve registering a user's payment account information with an Issuer, payment processor or other entity, and associating the payment account data with a user's mobile phone number. This association may take the form of a mapping, table, or other suitable data structure. The mapping, table, or other data structure will typically be stored on a server operated by an Issuer, but may also or instead be stored on a server operated by an element of the payment processing system. The mobile phone number may correspond to the number for a mobile phone, PDA, or other suitable device. One of the underlying concepts of embodiments of the invention is to provide a means for contacting the user on a device that is expected to be in the user's possession, and which would not be expected to be in the location of their personal or home computer when they are away from that personal or home computer. In this way even if someone other than the user gains access to the user's home computer and attempts to conduct a payment transaction, that person will not be able to complete the authorization process because they presumably will not have access to the valid user's alternative means of communication.

Embodiments of the inventive out of band authentication process provide an additional layer of security for payment transactions and is especially useful for authenticating card not present transactions. The data or response provided by a user via the out of band communication channel serves as additional identification or authentication data to that provided in other forms or via another communication channel. The process or operations used to acquire the additional data provided by the inventive out of band process may be managed by the Issuer, the payment processor, or another suitable entity. The additional data provided by the user may take the form of a previously registered password, digital certificate password, or other suitable data that is associated with the user, the user's mobile device, or the user's payment account, for example. Note that in some embodiments, a user may enter their payment account data into a merchant's web-site to initiate the out of band authentication process, while in other embodiments, a user may only need to enter their mobile phone number into the web-site to initiate the out of band process. Note also that in some embodiments, the user may enter the payment account data or mobile phone number into a web-site operated by the Issuer of the payment account, where the user is directed to that site after selection of a desired payment account or Issuer at a merchant web-site.

Figure 3:
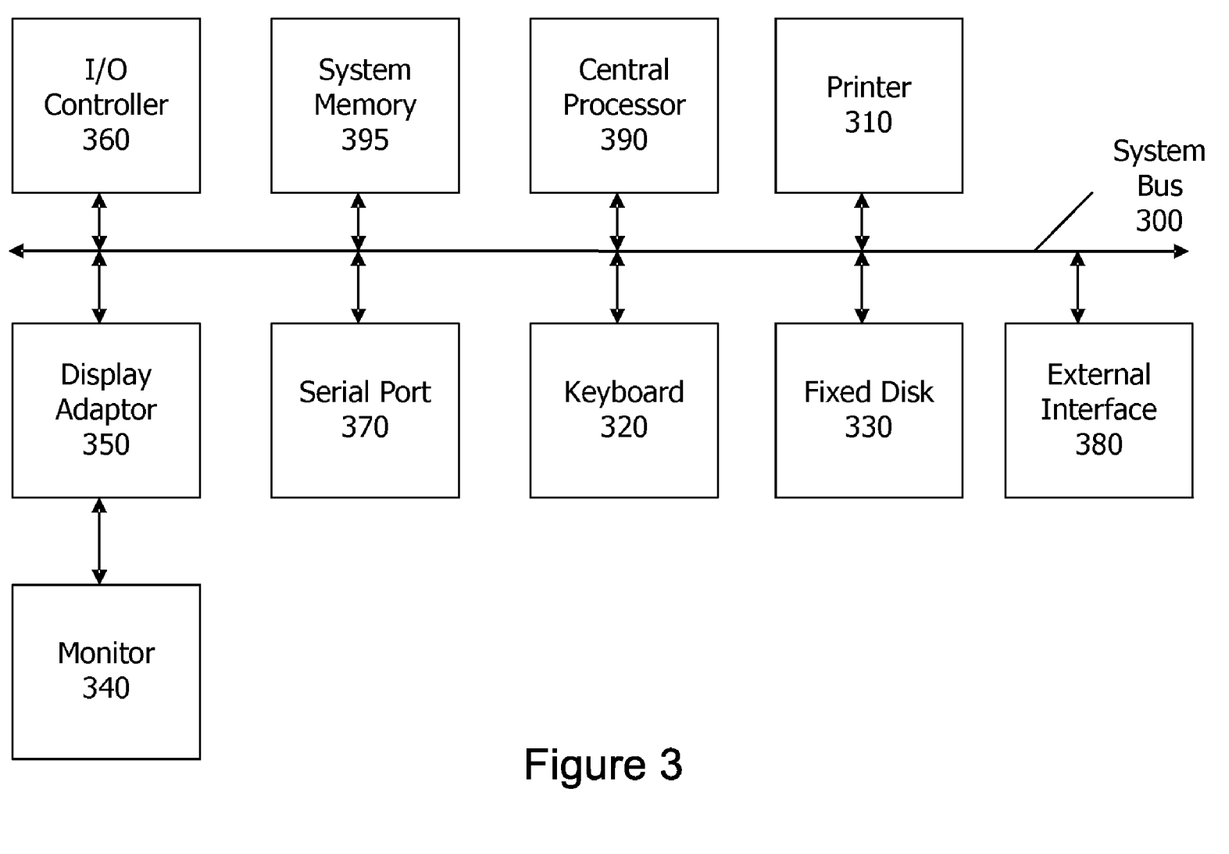
FIG. 3 is a block diagram of the primary functional elements of a computer system that may be used to implement an embodiment of the present invention.

FIG. 3 is a block diagram of the primary functional elements of a computer system that may be used to implement an embodiment of the present invention. The elements of the computing apparatus illustrated in FIG. 3 may be used to implement embodiments of the inventive processes, methods, or operations in whole or in part, and may be part of a server or other computing apparatus (e.g., a mobile gateway, an Issuer managed server, etc.). The subsystems shown in FIG. 3 are interconnected via a system bus 300. Additional subsystems such as a printer 310, keyboard 320, fixed disk 330 (or other memory comprising computer readable media), monitor 340, which is coupled to display adapter 350, and others are shown. Peripherals and input/output (I/O) devices, which couple to I/O controller 360, can be connected to the computer system by any number of means known in the art, such as serial port 370. For example, serial port 370 or external interface 380 can be used to connect the computer apparatus to a wide area network such as the Internet, a mouse input device, or a scanner. The interconnection via system bus allows the central processor 390 to communicate with each subsystem and to control the execution of instructions from system memory 395 or the fixed disk 330, as well as the exchange of information between subsystems. The system memory 395 and/or the fixed disk 330 may embody a computer readable medium.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A transaction processor, comprising:
    an electronic processor;
    a memory coupled to the electronic processor; and
    a set of instructions stored in the memory which, when executed by the electronic processor cause the payment transaction processor to
        receive a request to authorize a payment transaction initiated by a consumer using a merchant's web-site, the payment transaction initiated by the consumer using a first device coupled to a first communications channel;
        enable a consumer to download an application to a second device, the application providing the second device with the ability to access a digital certificate associated with the consumer;
        process the received request to authorize the transaction to determine a payment account associated with the consumer;
        determine, based on the payment account, data that may be used to contact the consumer on the second device;
        send a request to the consumer to approve the transaction by sending the request to the second device over a second communications channel; and
        in response to the request sent to the consumer to approve the transaction, receive a message from the consumer generated by the second device and provided over the second communications channel, the message approving or denying the transaction and including the digital certificate associated with the consumer, the certificate serving to authenticate the consumer.

2. The transaction processor of claim 1, wherein the application further enables the second device to securely communicate with a gateway server that couples the second communications channel to a different communications channel.

3. The transaction processor of claim 1, wherein the data that may be used to contact the consumer on the second device is a phone number associated with the second device.

4. The transaction processor of claim 1, wherein the first device is a computing device coupled to the first communications channel.

5. The transaction processor of claim 1, wherein the request to approve the transaction includes an address to which a response to the request should be directed.

6. The transaction processor of claim 4, wherein the digital certificate corresponds to a digital certificate resident on the computing device.

7. A method of processing an electronic payment transaction, comprising:
    registering a user by associating contact data for the user with the user's payment account, the contact data corresponding to an identifier for a first device coupled to a first communications channel;
    enabling the user to download an application to the first device, the application providing the first device with the ability to access a digital certificate associated with the user;
    receiving a request to authorize an electronic payment transaction initiated by the user using a second device coupled to a second communications channel;
    generating a message requesting that the user approve the electronic payment transaction;
    sending the payment transaction approval message to the user over the first communications channel using the contact data; and
    in response to the payment transaction approval message, receiving a message from the user approving or denying the payment transaction, the message including the digital certificate associated with the user, the certificate serving to authenticate the user.

8. The method of claim 7, wherein the application further enables the first device to securely communicate with a gateway server that couples the first communications channel to a different communications channel.

9. The method of claim 7, wherein the first communications channel is a cellular network.

10. The method of claim 7, wherein the first device is a mobile phone and the contact data includes the user's mobile phone number.

11. The method of claim 7, wherein the payment transaction approval message is a SMS message.

12. The method of claim 7, wherein the payment transaction approval message includes an address to which the response to the message should be sent.

13. The method of claim 7, wherein the method further comprises
    using the downloaded application to access the digital certificate from a server or from the user's second device.

14. A method of processing an electronic payment transaction, comprising:
    enabling a user to download an application to a first device coupled to a first communications channel, the application providing the first device with the ability to access a digital certificate associated with the user;

receiving a request to authorize the electronic payment transaction, wherein the electronic payment transaction is initiated by the user at a merchant's web-site using a second device coupled to a second communications channel;

sending a request for authentication data to the user over the second communications channel, the request for authentication data received by the user on the second device;

receiving a response to the request for authentication data from the user over the second communications channel;

processing the response to determine a payment account associated with the user;

using the determined payment account as a source of payment for the electronic payment transaction;

generating a transaction approval message for the electronic payment transaction;

sending the transaction approval message to the first device over the first communications channel; and receiving a response to the transaction approval message from the first device, the response including the digital certificate associated with the user, the certificate serving to authenticate the user.

15. The method of claim 14, wherein the transaction approval message is a SMS message.

16. The method of claim 14, wherein the transaction approval message is an email message.

17. The method of claim 14, wherein the transaction approval message includes an address to which the response to the transaction approval message should be sent.

18. The method of claim 14, wherein the method further comprises
using the downloaded application to access the digital certificate from a server or from the user's second device.

19. The method of claim 14, wherein the first device is the user's mobile phone.

20. The method of claim 14, wherein the authentication data is one or more of the user's mobile phone number or a password associated with the user.

* * * * *